United States Patent [19]

Kirk, Jr. et al.

[11] 3,916,091

[45] Oct. 28, 1975

[54] ELECTRONIC COMMUNICATIONS SYSTEM FOR SUPPLEMENTARY VIDEO PROGRAM DISTRIBUTION

[75] Inventors: Donald Kirk, Jr.; Michael J. Paolini, both of St. Petersburg, Fla.

[73] Assignee: Columbia Pictures Industries, Inc., New York, N.Y.

[22] Filed: Jan. 31, 1973

[21] Appl. No.: 328,377

[52] U.S. Cl. ........... 178/5.1; 178/DIG. 13; 325/308

[51] Int. Cl.$^2$ ........................................... H04N 1/44

[58] Field of Search ....... 178/5.1, DIG. 13; 325/308

[56] References Cited

UNITED STATES PATENTS

| | | | |
|---|---|---|---|
| 3,231,818 | 1/1966 | Court | 178/5.1 |
| 3,387,083 | 6/1968 | Farber et al. | 178/5.1 |
| 3,668,307 | 6/1972 | Face et al. | 325/308 |
| 3,676,580 | 7/1972 | Beck | 178/5.1 |
| 3,733,430 | 5/1973 | Thompson et al. | 178/DIG. 13 |
| 3,757,225 | 9/1973 | Ulicki | 325/308 |
| 3,777,053 | 12/1973 | Wittig et al. | 178/5.1 |
| 3,790,700 | 2/1974 | Callais et al. | 178/5.1 |

*Primary Examiner*—Maynard R. Wilbur
*Assistant Examiner*—S. C. Buczinski
*Attorney, Agent, or Firm*—Kenyon & Kenyon Reilly Carr & Chapin

[57] ABSTRACT

A one-way cable communications system - as for a lodging facility, distributes commercial and supplementary video programing from common equipment to spaced subscriber stations located, for example, in each hotel-motel room. Heterodyne converter apparatus is included at each station for viewing the supplementary programing on a standard television receiver. The system includes common address and command transmitting, and room terminal receiving equipment to control the video reception mode for the several room terminals.

51 Claims, 4 Drawing Figures

ELECTRONIC COMMUNICATIONS SYSTEM FOR SUPPLEMENTARY VIDEO PROGRAM DISTRIBUTION

DISCLOSURE OF INVENTION

This invention relates to electronic signal distribution systems and, more specifically, to a one-way signal translating system for distributing commercial and supplementary video programming from a central station to plural spaced subscriber locations.

In selected present day private communications systems, it has been found desirable to provide some electronic intelligence which may be received only by system subscribers who pay for this service. Thus, we have found that lodging service may be enhanced for all concerned where the hotel-motel proprietor makes supplementary programing — e.g., theater, first run movies, sporting events or the like available, as on an extra fee basis, on the television receiver presently located in most leased rooms. This is, of course, in addition to providing normal commercial television programing broadcast by local stations without charge.

It is thus an object of the present invention to provide an improved private service communications system.

More specifically, it is an object of the present invention to provide a cable system for distributing commercial and supplementary video signals, addressing structure being provided to restrict viewing access to designated subscribers.

The above and other objects of the present invention are realized in a specific, illustrative system for providing restricted access one-way communications between common transmission equipment and plural subscriber locations via a distribution cable. The common equipment generates a signal ensemble which includes commercial video programing in its normal spectrum allocation; and supplementary premium video and digital addressing and command signals (as in the midband channel 6–7 gap).

The digital control information is coincidentally received and decoded at all (or a subset, such as one hotel or several) system subscriber stations. The digital signaling comprises a unique word-synchronizing binary pattern, followed by command and address digits in a prescribed word format. A transmitted control word may enable or inhibit reception of a specific program at a specifically identified address-subscriber station, or at all addresses.

Figures 1A, 2:
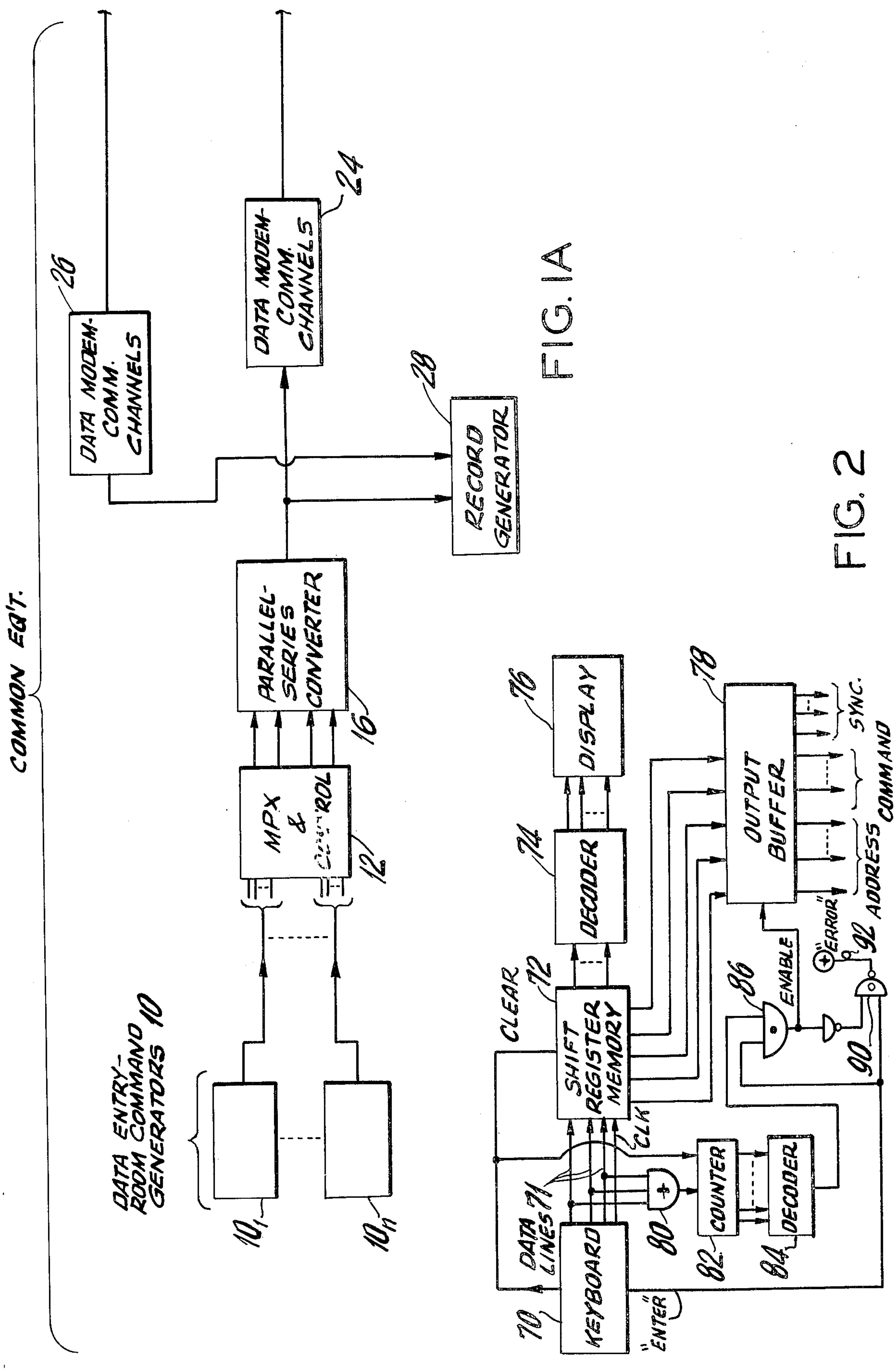
Figure 1B:
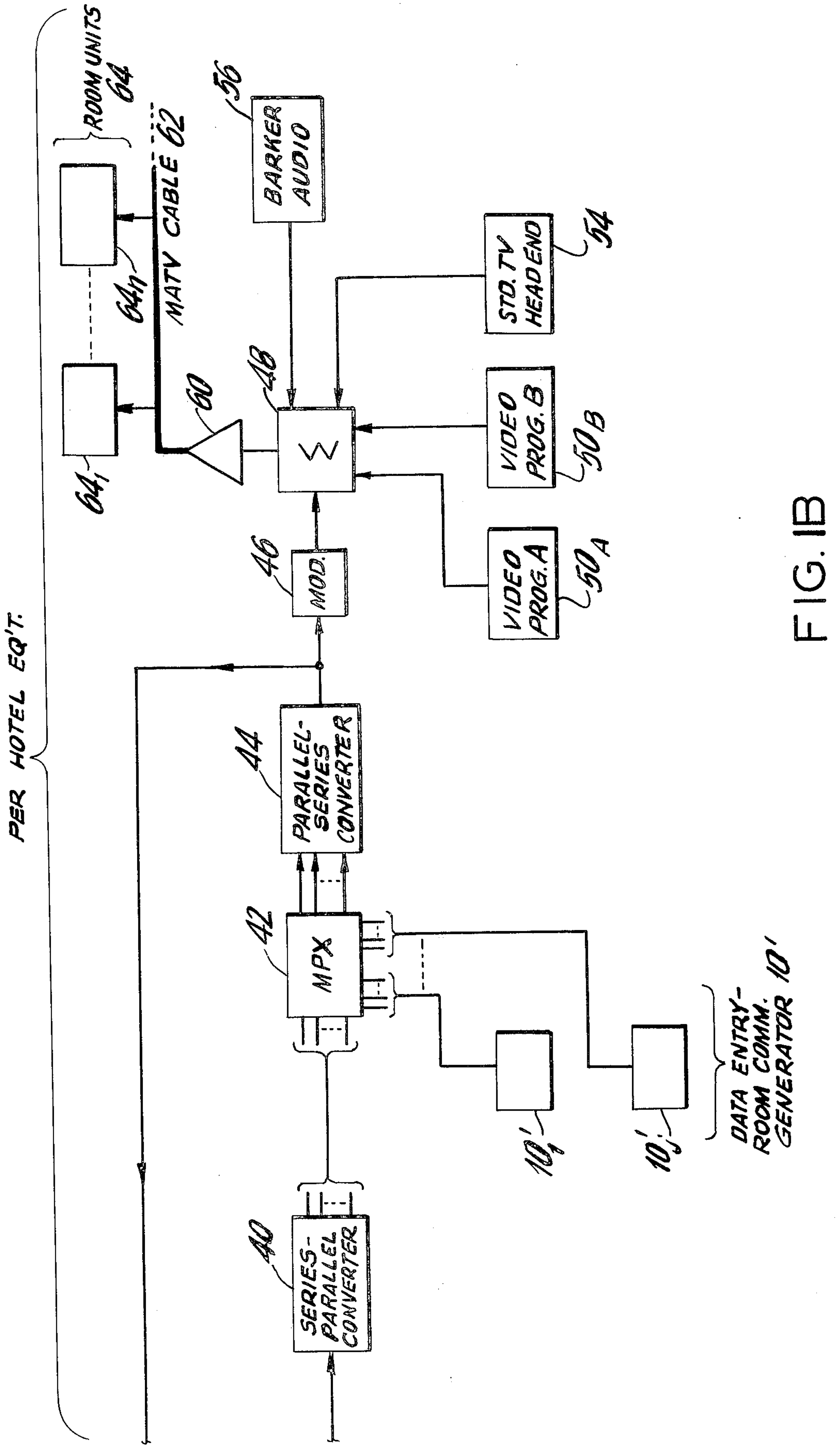
Figure 3:
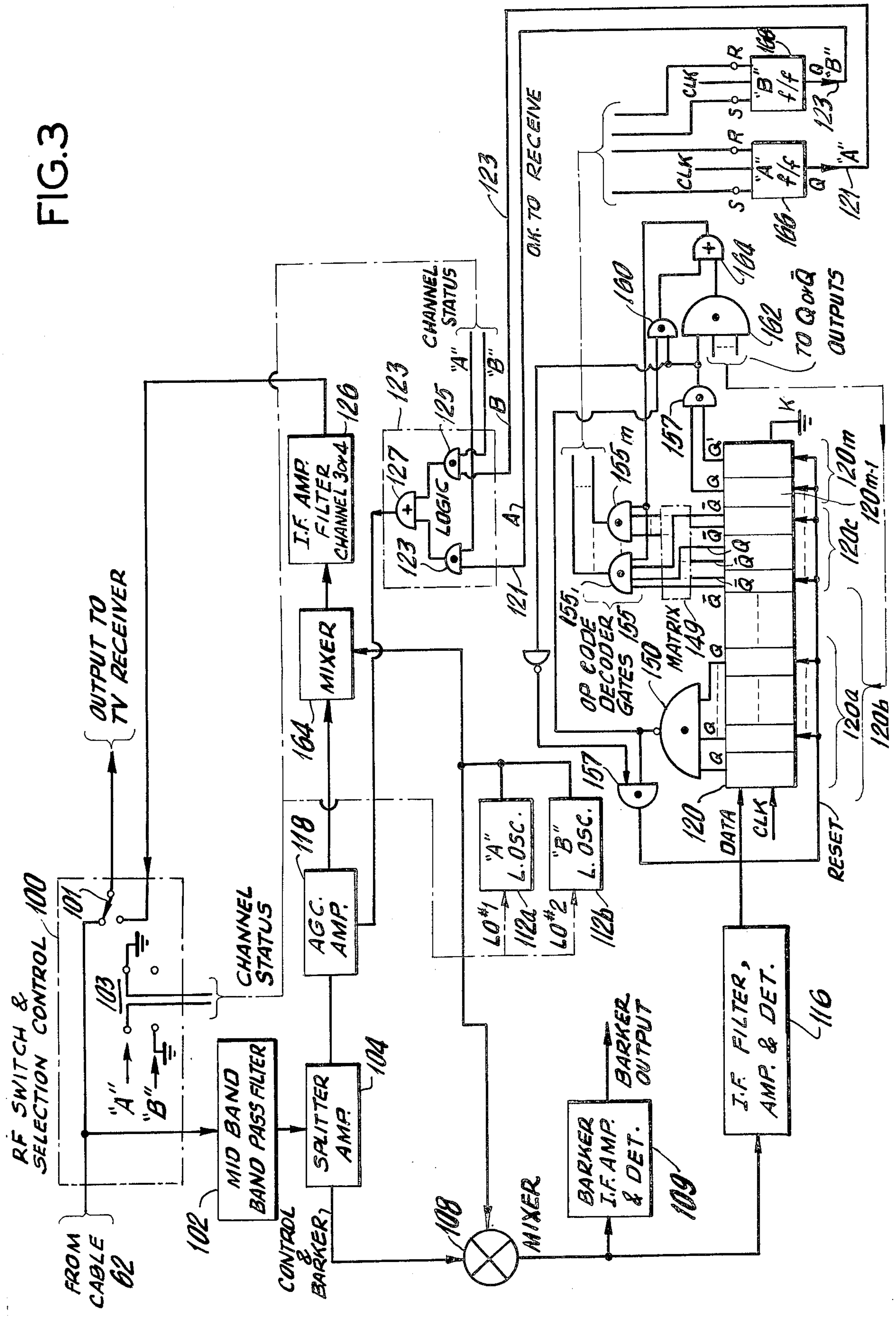

The above and other features and advantages of the present invention will become more clear from the following detailed description of a specific embodiment thereof, presented hereinbelow in conjunction with the accompanying drawing, in which:

FIGS. 1A and 1B comprise the left and right portions of illustrative video distribution system equipment embodying the principles of the present invention;

FIG. 2 depicts a command generator employed in the system of FIGS. 1A and 1B, and FIG. 3 depicts room terminal equipment which selectively permits reception of private video signals at the several system subscriber locations.

Referring now to FIGS. 1A and 1B, hereinafter referred to as composite FIG. 1, there is shown a private video distribution system in which a plurality of system subscribers, each having a room terminal unit 64 associated therewith, receive commercial locally available television programing and, selectively also, premium video information via a distribution channel 62, e.g., an MATV cable in a hotel-motel context. A standard television signal recovering head end 54 supplies to a signal linear combining network 48 commercial, "off-the-air" television signals locally available at a hotel environment. Also supplies to the combining network 48 are first and second ("A" and "B") premium video programs supplied by sources $50_a$ and $50_b$ thereof. The private programs may comprise first run movies, sporting events, theater presentations or the like.

Further supplied to the network 48 is a source of digital control information which controls the permissible mode of signal operation of each of the room terminal units 64 vis-a-vis reception of the premium A and B programs. Each data control message supplied by a modulator 46 comprises a binary word of fixed length and prescribed format. For purposes of concreteness, each word is assumed to comprise a leading word synchronizing digit group (e.g., eight consecutive binary 1's—this particular pattern is readily decoded, and also cannot exist as data with BCD coded information); followed by a group of command digits (e.g. three) which controls the mode of operation of a converter unit 64 identified by address bits; followed, in turn, by the address digits to identify a particular one of the units $64_i$–$64_k$ to receive the command. The repertoire of instructions may comprise, for example, enable reception of the A program (110); inhibit reception of A (100); permit reception of B (011); and inhibit reception of B (001). In addition, as more fully discussed below, a further particular control signaling format will permit simultaneous activation of all room terminal units to enable or inhibit all units coincidentally.

As a final input to the linear combining network 48, a barker or advertising audio message is supplied by a source 56 thereof and impressed on the cable via the summing network and a cable driving amplifier 60. The barker program may be used for any desired purpose such as providing constantly available advertising for the private video programs A and B, e.g., starting time, cost, reviews, viewing channel, and the like.

The various signals supplied to the linear combining network 48 by the sources 46, $50_a$, $50_b$, 54 and 56 may comprise any modulation form and frequency allocation desired. We have found it convenient and desirable to provide the commercial video material from the source 54 at the normally allocated channel frequency designations therefor, and to allot the remaining information to the frequency midband gap between channels 6 and 7. Further, we space the data carrier for the modulator 46 midway between the local oscillators at the room terminals 64 employed to receive the A and B programs for purposes below discussed, the barker carrier being disposed in a frequency-spaced relationship with respect to one of the local oscillators, e.g., that for the A program.

In accordance with the basic aspects of the present invention, a particular room unit 64 is afforded a particular mode of operation by a system room command generator 10. The generator 10 may comprise an element 10' located at the hotel, or the generator 10 may be located at some common (e.g., "downtown central") station. Plural local command generators 10' may be employed at the hotel such that video reception may be permitted from various locations (e.g., desk clerk, telephone operator and/or the like) responsive to a quest's requests, the several generators being multiplexed via a multiplexer 42 of any common construction. Moreover, one or more of the generator 10 may be automatic in nature (e.g., in the form of stored tape message equipment or the like) to automatically transmit a number of successive unit 64 enabling-disabling messages. Similar automated equipment may be included among the room generators 10 at the common location.

To illustrate the basic nature of the room terminal control, assume that a quest in one of the rooms, e.g., that associated with a room terminal unit $64_i$ requests access to the A movie. Accordingly, a clerk at one of the local command generators 10' (e.g., $10_1'$) depresses keys at his console keyboard to generate a message comprising an address identifying the i-th room, and command keys with the enable A code. He views the message to be sent at his equipment $10_1'$ and, assuming it is correct, depresses an execute key which passes the address and command information to a parallel-to-series converter 44 via the multiplexer 42. The information supplied by the generator $10_1$ automatically includes the sync pattern as leading information. The full message comprising the sync, command, and address information, in that order, is converted from parallel to serial form by the structure 44 and supplied as a modulation input to the modulator 46. The control data from the modulator 46 is then impressed by the summing network 48 and amplifier 60 onto the cable 62 where upon it propagates to, and is essentially coincidentally received by each of the room terminal units 64. In the manner described below only the particular room unit $64_i$ identified by the address portion of the transmission responds to the message and receives the enable A command.

It may sometime by desired to have a common station control room unit to distribute messages to a number of hotels or the like, as in a major city, convention environment or the like. To this end, data entry room command generators 10 may be employed at some common location. An enabled one of the generators 10 provides a control message in the manner described above with respect to a like generator 10'. That is, the parallel information from one of the generators 10 passes through a multiplexer 12; is converted to parallel form by a unit 16; is communicated to the hotel locations via data modems and communication channels 24; and is converted at the hotel to parallel form by an element 40 to serve as additional inputs to the local command selecting multiplexer 42. Moreover, if desired, a permanent record generator 28 may be employed to record (as for billing) all commands issued at either the common or hotel locations, reverse transmission from the hotels to the generator 28 being provided by data modems — communications channels 26 as desired. Specific embodiments for the digital multiplexers 12 and 42, parallel-to-series converter 44, series-to-parallel converter 40, data modems and communications channels 24 and 26 will be readily apparent to those skilled in the art, as are the various control configurations for merging information generated by plural generators.

An illustrative embodiment for a room control generator 10 or 10' is shown in FIG. 2 and comprises a data entry keyboard 70 which supplies serial information shifted via a plurality of data lines 71 into a shift register memory 72. The contents of the memory 72 are decoded at an element 74 and displayed in a display 76 such that the operator can visually inspect the developing address and command message portions to verify their accuracy. When an enter key on the keyboard 70 is depressed, output buffering gates 78 are normally enabled by an AND gate 86 and the contents of the buffer 78 supplied to the multiplexer. The output of the buffer 78 comprises a sync pattern of fixed digits, and command and address digits entered at the keyboard.

As a verification measure, an OR gate 80 connected to each of the data lines 71 signals a counter 82 each time an information key is depressed, the outputs of the counter 86 being decoded at a decoder 84. The decoder 84 will enable the AND gate 86 only when the proper number of message characters has been produced (i.e., the prescribed number of address bits and command bits) such that the enter key cannot activate the output buffer lines unless the proper number of message bits has been entered. If the enter key is depressed at any other time, a coincidence gate 90 is fully enabled and illuminates an error lamp 92. If the operator is dissatisfied with the message or makes an error, he may simply clear the memory 72 and counter 86.

Turning now to the room terminal equipment shown in FIG. 3, equipment 64 is connected to the MATV cable 62 by radio frequency and selector control switch apparatus 100, the output of the unit 100 being connected to the antenna terminals of standard television receiver at the subscriber room. When a radio frequency switch 101 in the unit 100 connects the room receiver directly to the cable (the upper transfer contact position shown in the drawing) the television receiver receives all of the commercial video programming, but not the private information which is lost in the receiver midband.

To receive private programing, the transfer (output) contact of the switch 101 is connected to its lower position, and the receiver tuned to a locally unused channel, e.g., the spectrum of unused channel 3 or 4. Further, an A-B private video channel status selector switch 103 is placed in an A or B position depending upon whether the A or B program is to be viewed.

The signals in the midband spectrum received at the converter terminal 64 are selected by a band pass filter 102 and passed through a splitter amplifier 104 to each of an automatic gain control amplifier 118, and a mixer 108. Further, one of two gated local oscillators $112_a$ and $112_b$ is turned on by the state of the private channel selector switch 103. The output of the active oscillator $112_a$ or $112_b$ is supplied to mixers 108 and 164.

The signals supplied to the mixer 108 comprise one of the A or B program reception enabling local oscillators $112_a$ or $112_b$ and the entire midband spectrum. A first IF filter-amplifier and detector 116 connected to the output of the mixer 108 is tuned to a frequency given by one half of the difference in frequency between the outputs of the two local oscillators $112_a$ and $112_b$. Accordingly, no matter what the position of the switch 103 (i.e., whether the A or B program is desired), the IF amplifier and detector 116 continuously recover control data (i.e., recover the modulation from the output of element 46 by conventional heterodyning-detection), and supply the serial control data bit stream to the data input of a shift register 120 at the receiver 64. Thus, at each room terminal unit 64, all data impressed on the MATV cable continuously flows through a shift register 120 there contained. Further, it is assumed here that bit synchronization is provided by using a common 60 cycle power line rate and phase for all equipment items of the composite FIG. 1 system, although bit sync and phase may be obtained in any manner well known to those skilled in the art, as from the data bit stream per se.

A barker IF filter-amplifier and detector receives the beat product outputs of the mixer 108, and is tuned to receive signals of a frequency band given by the difference between the A program local oscillator $112_a$ and the barker carrier above described. Thus, when the transfer switch 103 is in the receive A position (upward in FIG. 3) the barker audio program is received, heterodyned and demodulated by the equipment 109, and reproduced via an amplifier and loudspeaker at the room converter terminal 64 (this reproduction equipment not being shown for purposes of conciseness).

By way of general overall operation, the premium video programs passing through the band pass filter 102 and splitter amplifier 104 are supplied to the variable gain amplifier 118 where they are selectively passed or blocked under the control of an AGC control signal ("CONTROL") developed by a combinatorial logic network 122. The CONTROL output of the logic network 122 passes video signals through the amplifier 118 when:

a. reception of the A program is permitted (an enabling signal or a lead 121 [from an "OK to receive A" command preserving flip-flop 166] to partially enable and AND gate 123) and the A program is desired at the room terminal (a 1 input [a high level voltage or an open circuit for conventional current sinking integrated circuit logic gates] from the A channel status output of the switch 103 which fully enables the gate 123); or (an OR gate 127 is enabled when the logic condition for either of two AND gates 123 or 125 is satisfied), b. reception of the B program is permitted (a logical one on a lead 123 to partially enable the AND gate 125) and the selector switch 103 choses the B program ( a high B output line from the selector switch 103 to fully enable the AND gate 124); and not otherwise.

The setting of the selector switch 103 enables a selected one and only one of the local oscillators $112_a$ or $112_b$ as above described, and that oscillation is supplied to the mixer 164. Assuming that reception of the program corresponding to the switch 103 selection has been authorized, the logic structure 122 CONTROL signal passes both premium video programs through the AGC amplifier 118 to the mixer 164. Thus an output IF filter-amplifier-detector connected to the mixer and tuned to channel 3 or 4 as locally appropriate then extracts the proper one of the two private programs for viewing dependent upon the particular local oscillator 112 which is energized. This obtains by scaling the frequency difference between the A program local oscillator $112_a$ and the A program supplied by the source $50_a$ to identically correspond to the channel 3 or 4 band, a like relationship obtaining between the B program and the B local oscillator frequency. The selected program at the output of the IF amplifier-filter-detector 126 is then connected by the switch 103 to the subscriber television receiver where it is viewed by simply tuning that receiver to the appropriate one of channel 3 or 4.

Focus will now be placed upon the operation of the control portion of FIG. 3 converter terminal unit. All data on the cable steps through the shift register 120 at the room terminal 64, the shift register comprising, for example, cascaded J-K flip-flop stages. When a sync pattern is first received, a binary one resides in each one of the first eight shift register stages $120_a$ and an AND gate 150 connected to the Q outputs of the eight flip-flop stage is fully energized. The output of the AND gate 150, acting via a normally otherwise activated AND gate 151, responds to the sync pattern by clearing (resetting) all of the shift register stages, except for the first stage. Thus, upon sync recognition, the first shift register stage contains a binary one while all other shift register stages contain a binary 0.

The succeeding message digits are then received until the initial 1 and 0 in the first two shift register stages upon sync recognition have propagated to reside in the last two register stages $120_{m-1}$ and $120_m$. When this condition obtains, the command message bits reside in a shift register portion 120, and the address information resides in shift register stages $120_b$.

The 1 — 0 pattern in the final two register stages is decoded by a coincidence gate 157 which responds to this condition by partially enabling a coincidence gate 162 having its remaining inputs connected to the Q or Q' output of each shift register stage of address stages $120_b$ in a unique pattern corresponding to and establishing the particular address of the unit. If the message is not for the particular unit 64, the input conditions for the AND gate 162 will not be satisfied, i.e., all inputs thereto will not be 1's since one or more address digits will have a 0 at the Q or Q' output to which inputs of the gate 162 are connected. However, if the message is for the converter, the address decoding gate 162 will receive all ones at the address input portion thereof and fully switch to enable a plurality of command decoder gates 155 via an OR gate 164.

The Q and Q' outputs of the command storing flip-flop register stages $120_c$ (assumed to be three in number) are supplies to a distribution matrix 149 and, therefrom in selected mutually distinct patterns, to the inputs of the command decoding gates 155. Thus, for example the gate $150_1$ decodes an "enable reception of A" 110 pattern by connection to the Q, Q and Q' outputs of the three stages which are all high only when an enable A command signal is being propagated. Thus, when all gates 155 are conditioned by the OR gate 164 when the message is destined for the particular converter terminal, the incoming command fully enables one and only one of the gates 155.

The outputs of the gates 155 (one high of *n*) are coupled to command storage flip-flop 166 and 168 which are respectively associated with reception of the A and B video programs. That is, when the A and/or B flip-flops 166 and 168 are set, reception of the A and/or B video programs is permitted, respectively, and not otherwise. The outputs of the gates 155 may therefore directly energize the set and reset inputs of the flip-flop 166 and 168 to selectively enable or inhibit reception of the premium programs. The particular manner in which a set flip-flop 166 or 168 operates in conjunction with a particular setting of the switch 103 to permit reception has been considered hereinabove with respect to the discussion logic circuitry 122.

It is sometimes desired that a particular command be given to the entire ensemble of room terminal units, as to permit reception of one of the signals or to inhibit a channel at all locations after a particular program ends to initiate a new ordering-access and billing cycle for a succeeding program. To this end, a particular message comprising a sync pattern, the particular command, and another sync pattern in the final eight address positions is generated. For this "all call" message, the AND gate 150 will be energized by the eight all call digits at the same time that the gate 157 is enabled by the 1—0 pattern produced by the initial message sync pulse group. Accordingly, a gate 160 is switched by the gates 150 and 157 and enables the OR gate 164 which conditions all command decoders 155 at all subscriber locations such that the command residing in the shift register stages $150_c$ is executed in the manner above discussed. It is observed that the address decoding gate 162 is by-passed in this all call mode since that address gate cannot be satisfied for more than any one unit.

It is also observed that the final shift register stage $120_m$ is adapted to latch in the one state following the first one entered therein (by the shifted final sync bit) — as by a grounded K input. Thus, the AND gate 157 (and the command decoders 155) cannot be spuriously activated by an arbitrary data bit pattern propagating through the register 120. To the contrary, once set, the control electronics of FIG. 3 require another sync recognition (to reset the register stage $120_m$) before another command can be entered therein.

The above described system arrangement has thus been shown to provide for restricted access, under control of enabling commands, to premium video programming in a cable distribution context.

The above described arrangement is merely illustrative of the principles of the present invention. Numerous modifications and adaptations thereof will be readily apparent to those skilled in the art without departing from the spirit and scope of the present invention.

What is claimed is:

1. In combination in a private service video distribution system, signal distribution means, source means for supplying to said signal distribution means a signal ensemble comprising at least one private video program and digital control signaling, said digital control signal comprisng serial message words including in sequence a word synchronizing digit group, an address digit group and a command digit group, and at least one converter terminal coupled to said signal distribution means, said converter terminal comprising:

a. a shift register for receiving and storing the serial message words from said digital control signaling;
b. coincidence means coupled to a selected position of said shift register and providing a first output signal responsive to a predetermined word synchronizing digit group being received in said selected position within said shift register;
c. means having an input coupled to said coincidence means and responsive to said first output signal for resetting all but selected stages of said shift register;
d. address recognizing means connected to said shift register, said address recognizing means having an enable input coupled to said coincidence means and responsive to said first output signal to provide a second output signal response to a predetermined digit group being received and stored in said shift register; and
e. command decoding means having an enabling input coupled to said address recognizing means responsive to said second output signal, said address recognizing means selectively responsive to a command digit group being received and stored in said shift register.

2. A combination as in claim 1 wherein said converter termiinal further comprises means responsive to the output of said command decoding means for selectively permitting reception of said private video programs.

3. A combination as in claim 2 wherein said reception permitting means comprises selectively operable heterodyning means for shifting the frequency spectrum of said private video program responsive to signaling from said command decoding means.

4. A combination as in claim 3 wherein said selectively operable heterodyning means includes automatic gain control amplifier means responsive to the output of said command decoding means for selectively passing said private video program therethrough.

5. A combination as in claim 1 wherein said command decoding means includes command preserving flip-flop means for selectively permitting reception of said private video program, and decoding coincidence logic means for controlling said command preserving flip-flop means.

6. A combination as said switch claim 1 wherein said signal ensemble comprises at least one additional private video program, said converter terminal further comprising plural local oscillators, switch means for energizing a selected one of said local oscillators, gates heterodyning means responsive to the energized one of said local oscillator means, and logic means responsive to the status of said switch means and to the commands received by said command decoding means for selectively conditioning said gates heterodyning means.

7. A combination as in claim 1 wherein said signal ensemble further comprises a source of barker channel information, and wherein said converter terminal further comprises barker channel receiving means.

8. A combination as in claim 1 further comprising means responsive to a particular pattern of information within said shift register for enabling said command decoding means.

9. A combination as in claim 1, wherein one of said shift register stages includes state latching means.

10. A combination as in claim 1, further comprising plural additional converter terminals connected to said signal distribution means, wherein said signal ensemble further selectively comprises an all call digital code pattern for addressing all of said converter terminals, each of said terminals comprising means responsive to reception of a word synchronizing digit pattern group and to the reception of an all call code group for bypassing said address recognizing means and enabling said command decoding means.

11. A combination as in claim 1 wherein said source means includes a modulator, and means for supplying serial control information to said modulator.

12. A combination as in claim 11, wherein said source of serial control information comprises a first room command generator.

13. A combination as in claim 12, wherein said source of serial control information further comprises a parallel-to-series converter interposed between said room command generator and said modulator.

14. A combination as in claim 13, further comprising at least one additional room command generator, and multiplexing means for selectively connecting one of said command room generators with said parallel-to-series converter.

15. A combination as in claim 11, further comprising common equipment means for supplying said serial control signals to said modulator.

16. A combination as in claim 15, further comprising record generating means for recording a measure of the digital control signals supplied to said signal distribution means.

17. A communication system for selectively enabling at least one predetermined subscriber of a plurality of subscribers to utilize information signals transmitted thereto by way of at least one secure channel of a transmission path, the selective enabling of the subscriber being in response to predetermined control signals transmitted over the transmission path which are distinct for each subscriber, comprising:

a. at least one control system including:

1. means for propagating the information signals on the secure channel of the transmission path;

2. means for sending the predetermined control signals in the form of a binary coded decimal including a series of a binary logical bits by way of the transmission path, the predetermined control signals for each different predetermined subscriber including at least, i. a synchronizing signal portion made up of a first predetermined series of binary bits, ii. an address signal portion made up of a second predetermined series of binary bits which is different for each different predetermined subscriber, and iii. a command signal portion made up of a third predetermined series of binary bits for selectively enabling only the subscriber corresponding to the address signal to utilize the information signals, the command signal portion being different for each different secure channel; and b. a plurality of means each associated with a different predetermined subscriber for enabling a predetermined subscriber to utilize the information signals transmitted by way of the secured channel of the transmission path in response to the predetermined control signals transmitted over the transmission path which are distinct for the predetermined subscriber, the enabling means including:

1. control signals storage means comprising a shift register having a plurality of consecutive cells, each cell being capable of registering one binary digit, said shift register being further of a type capable of causing and accomodating the procession of a series of received binary bits through said cells in consecutive order, the same as the order of receipt of said binary bits at said shift register, the first predetermined series of binary bits being provided into successive cells of said shift register until all of said first series of bits are received and reside in a first series of cells of said shift register;

2. a first AND/gate having inputs coupled to different ones of said first series of cells for generating a synchronization recognition signal when said first predetermined series of bits resides in said first series of cells;

3. register clearing means responsive to said synchronization recognition signal and coupled between the output of said first AND/gate and said shift register for clearing each cell of said shift register except the first cell of said first series of cells whereby the shift register after clearing receives only the last received bits;

4. address signal responsive means responsive to the receipt of said second different predetermined address signal portion for generating a command enabling signal;

5. command signal responsive means comprising a command decoder responsive to said command enabling signal and to receipt by said control signal storage means of said third predetermined series of binary bits for producing a command decode signal corresponding to said third series; and 6. secured channel control means responsive to said command decode signal for enabling utilization of information on said secure channel corresponding to said command decode signal.

18. The system of claim 17 in which the means for sending the predetermined control signals by way of the transmission path comprises:

a. means for generating each of the different address signal portions;

b. additional means for generating each different command signal portion; and c. means connected to the generating means and the additional generating means for selecting a predetermined address signal portion and a predetermined command signal portion to be generated thereby.

19. The system of claim 18 and further comprising:

a. means connected to the generating means and the additional generating means for providing a representation of the address signal portion and the command signal portion whereby the selected address signal portion and the selected command signal portion can be examined for accuracy; and b. means for cancelling the generated address signal portion and the command signal portion after a representation of inaccuracy.

20. The system of claim 18 and further comprising:

a. means connected to the generating means and the additional generating means for alternately storing and releasing the address signal portion and the command signal portion to the transmission path, the storing and releasing means being responsive to an execute instruction signal to release the stored address signal portion and command signal portion from the storing means; and b. means connected to the alternately storing and releasing means for selectively providing the execute instruction signal thereto.

21. The system of claim 20 in which:

a. the means for alternatively storing and releasing the address signal portion and the command signal portion includes an output buffer interposed between a storage means for storing said address and command signal portions and the transmission path, the output buffer when activated directing the stored address signal portion and the stored command signal portion to the transmission path; and b. in which the means connected to the alternately storing and releasing means for selectively providing the execute signal thereto includes means connected to the output buffer for activating the output buffer by an execute instruction which includes a trigger signal applied thereto.

22. The system of claim 21 and further comprising:

a. a plurality of control system; and b. means for multiplexing the output buffer of each of the plurality of control systems with respect to the transmission path, the multiplexing including means for transmitting trigger signals in a consecutive and repetitive order to each of the output buffers for enabling each output buffer to transmit an address and command signal it may contain to the transmission path.

23. The system of claim 21, wherein:

a. said output buffer presents said address and command portions of said control signals in parallel form, b. said system further comprising a parallel-to-series converter between said output buffer and said transmission path, and c. said system further comprises a series-to-parallel converter in said transmission path between said parallel-to-series converter and said utilization enabling means for reconverting said address and command portions to parallel form for receipt by said utilization enabling means, whereby the address and command portions may be transmitted over said transmission path in series form to make economical use of said transmission path and reconverted to parallel form for receipt by said utilization enabling means.

24. The system of claim 20, further comprising: binary coded decimal conversion means connected between said generating and additional generating means and said alternately storing and releasing means for directing at least said address portion of said control signals to said alternately storing and releasing means in binary coded decimal form.

25. The system of claim 20, further comprising: error detector means connected between said generation and additional generation means and said alternately storing and releasing means for producing an indication when said address and command portions differs from a predetermined norm.

26. The system of claim 17 and further comprising:

a. a plurality of control systems each including means responsive to a trigger signal for transmitting address and command signals to the transmission path; and b. means connected to each of the control systems for transmitting trigger signals to each different control system in a predetermined order, whereby the control systems are prevented from transmitting address and command signals simultaneously to the transmission path.

27. The system of claim 17, in which said means for sending said control signals further comprises: synchronization signal generating means connected to said transmission path and responsive to the transmission of said address and command portions for adding said synchronizing signal portion of said control signals to said address and command portions.

28. The system of claim 17, further comprising: a modulator in said transmission path between said sending means for said control signals and said utilization enabling means for rendering said control signals intelligible to said utilization enabling means.

29. The system of claim 28, said modulator serving to amplitude modulated said control signals on a carrier having a frequency lying between that of standard broadcast television channels 6 and 7.

30. The system of claim 29, further comprising:

a. said secure channels being at least two in number and having different carrier frequencies b. said utilization enabling means comprising a local oscillator corresponding to each of said secure channel carriers, each said local oscillator having a frequency output suitable for converting its corresponding secure channel carrier to the same standard broadcast television channel frequency when said output of said local oscillator is mixed with its corresponding secure channel carrier c. said carrier for said control information being midway between said output frequencies of said local oscillators, and d. means for mixing said outputs of each said local oscillator with its corresponding secure channel carrier signal.

31. The system of claim 17, said information on said secure channel being in the form of television video and audio signal modulated on a carrier.

32. The system of claim 17, further comprising:

a. shift register stop means connected to a stop cell of said shift register and responsive to the procession of said bit in said first cell of said first cell of said first series of cells to said stop cell for producing a stop signal to render said shift register non responsive to signals received after said first bit has proceeded to said stop cell, and to partly enable the production of said address recognition signal, whereby the procession of bits of said address and command signal portions through said shift register is halted when a predeterminned number of address and command signal bits are received, and said shift register is rendered impervious to any further spurions signals received.

33. The system of claim 32 further comprising:

a. said second series of binary bits being of a number corresponding to the number of cells of a second series of cells of said shift register;

b. said third series of binary bits corresponding to the number of cells of a third series of cells of said shift register for residing therein simultaneously with the residence of said address signal in said shift register, c. said address recognition means comprising a second AND gate having a different input connected to each different cell of said second series of cells and being responsive to the residence of said predetermined different address signal in said second series of cells and to the occurence of said stop signal to generate said address recognition signal.

34. The system of claim 33, further comprising: potentiometer means connected to at least some of said second series of cells of said shift register, whereby changing the settings of said potentiometer means changes said predetermined different address signal portion to which said address signal responsive means is responsive.

35. The system of claim 33, further comprising: said command decoder including a matrix and third AND gates, having the inputs of said matrix connected to said third series of cells, said third AND gates each having an enabling input connected to the output of said second AND gate, whereby the coincidence of said address recognition signal and of the decoding of said command signal cause said third AND gates to actuate said secure channel control means to enable a condition of reception of said secure channel information in accord with said command signal portion.

36. The system of claim 33, further comprising: a fourth AND gate having its inputs connected to receive said stop signal and the output of said first AND gate, the output of said fourth AND gate connected to said enabling inputs of said third AND gates of said command decoder whereby when an address signal portion having a portion thereof identical to said synchronizing signal is received by said control signal storage means such that the said identical portion of said address signal portion resides in said first series of cells, said command enabling signal is applied to said command decoder actuating the decoding and execution of the command signal portion regardless of the content of the non-identical portion of the address signal portion.

37. The system of claim 17, in which said utilization enabling means further comprises:

a. secure channel amplification means connected to said transmission path, said secure channel amplification means having adjustable gain to selectively render detectable said secure channel information b. amplification control means connected to said secure channel amplification means and being responsive to said command signal portion to vary the gain of said secure channel amplification means to permit or inhibit the utilization of said secure channel information.

38. The system of claim 17, wherein:

a. said sending means further comprises means for sending an all call address signal portion of said control signals, said all call address signal portion being different from all of said address signal portions which are different for each subscriber, and b. said address signal responsive means of a plurality of said utilization enabling means being additionally responsive to said all call address signal portion to become actuated to be responsive to said command signal portion.

39. The system of claim 38, wherein: at least a portion of said all call signal is identical to said synchronizing signal portion.

40. A method for selectively enabling at least one predetermined subscriber of a plurality of subscribers to utilize information signals transmitted to an enabling unit of said subscriber on at least one secure channel of a transmission path, said method comprising the steps of:

a. propagating the information signals to the subscribers over the transmission path, b. sending predetermined control signals in the form of binary logical bits over said transmission path to said subscribers, from a control signal source, said control signal including at least:

i. a synchronizing signal comprising a first series of bits, ii. an address signal comprising a second series of bits which is different for each different predetermined subscriber and iii. a command signal, comprising a third series of bits, and c. enabling a predetermined subscriber to utilize the information signals of the secure channel in response to the predetermined control signals, said enabling comprising the steps of:

i. conditioning the enabling unit in response to the synchronizing signal to respond to the address signal by:

1. directing said first series of bits into a first series of cells of the shift register, said first series of bits having a predetermined sequence, 2. sensing the presence of said predetermined sequence of bits in said first series of cells and 3. clearing all the cells of said shift register except one cell of said first series of cells in in response to the sensing of said synchronizing signal, ii. actuating the enabling unit of only the predetermined subscriber to be responsive to the command signal in response to receipt of the address signal, corresponding to the predetermined subscriber, and iii. providing the capabilities of utilization of the information signals by the enabling unit in response to receipt of the command signal.

41. The method of claim 40, in which said sending step comprises:

a. selecting a predetermined address signal and a predetermined command signal for sending, and b. generating said predetermined address signal and predetermined command signal in response to said selection.

42. The method of claim 41, further comprising the steps of:

a. generating a representation of the selected address and command signals, whereby the selected address and command signals can be examined for accuracy, and b. cancelling the generated address and command signals after a representation of inaccuracy.

43. The method of claim 41, in which said sending step further comprises the steps of:

a. storing the generated address and command signals, and b. releasing said address and command signals onto said transmission path in response to an execute instruction signal.

44. The method of claim 43, in which the step of sending said control signals further comprises:

a. sending said control signals from a plurality of control signal sources, and b. multiplexing the signals sent from said plurality of control signal sources with respect to said transmission path, the multiplexing steps including transmitting trigger signals in a consecutive and repetitive order to each of the control signal sources for enabling each control signal source to transmit its generated address and command signals in response to said trigger signals.

45. The method of claim 41, wherein:

a. said step of generating said address and command signals comprises generating such signals in parallel form, and b. said step of sending said control signals over said transmission path comprises converting said address and command signals to series form preparatory to sending said signals onto said transmission path, and reconverting said address and command signals to parallel form prior to impressing said address and command signals into said enabling unit.

46. The method of claim 40, in which said step of sending said control signals comprises:

modulating said control signals onto a carrier signal which is detectable by said enabling unit.

47. The method of claim 45, wherein:

a. said propagating step comprises modulating said secure channel information onto two secure channel carriers having different frequencies.

b. said enabling step comprises selectively mixing each said secure channel carriers with a different one of two output signals for converting each of said secure channel carriers to a different frequency, and c. said sending step comprises modulating said control signals onto a carrier whose frequency lies midway between those of said two output signals.

48. The method of claim 40 wherein:

a. said propagating step comprises modulating said secure channel information onto a secure channel carrier, and b. said enabling step comprises converting said secure channel carrier to a utilizable frequency by mixing said secure channel carrier with a locally generated signal, said locally generated signal being generated by a local oscillator having a resonant tank circuit at least part of whose elements contributing to resonance includes a piezoelectric crystal connected therein.

49. The method of claim 40, in which: said sending step comprises additionally generating and sending to said enabling units on all call address signal which is different from any of the said address signals corresponding to a predetermined subscriber and is recognizable by a plurality of said enabling units to enable said units to respond to said command signal to enable utilization of said secure channel information.

50. The method of claim 40 wherein said actuating step comprises:

a. directing the bits of said address signal into a second series of cells of said shift register, b. sensing whether the address signal in said second series of cells is that address signal corresponding to said predetermined subscriber, and c. enabling a command decoder to decode the encoded command of said command signal in response to said sensing of said corresponding address signal.

51. The method of claim 50, wherein said step of providing utilization capability comprises:

a. directing the bits of said command signal into a third series of cells of said shift register, b. then decoding said command signal in response to the sensing of said corresponding address signal, and c. executing the command encoded on said command signal in response to said decoding step.

* * * * *

UNITED STATES PATENT AND TRADEMARK OFFICE
CERTIFICATE OF CORRECTION

PATENT NO. : 3,916,091

DATED : October 28, 1975

INVENTOR(S) : Donald Kirk Jr. and Michael J. Paolini

It is certified that error appears in the above-identified patent and that said Letters Patent are hereby corrected as shown below:

Column 2, line 6, change "supplies" to --supplied--.

Column 2, line 26, change "$64_t$" to --$64_1$--.

Column 2, line 69, change "quest" to -- guest--.

Column 3, line 10, change "quest" to --guest--.

Column 6, line 21, change "120" to --$120_c$--.

Column 6, line 42, change "supplies" to --supplied--.

Column 7, line 45, change "comprisng" to --comprising--.

Column 8, line 8, change "termiinal" to --terminal--.

Column 8, line 28, delete "said switch"; and after "as" insert --in--.

Column 12, line 27, change "signal" to --signals--.

Signed and Sealed this

*thirtieth* Day of *March 1976*

[SEAL]

*Attest:*

RUTH C. MASON
*Attesting Officer*

C. MARSHALL DANN
*Commissioner of Patents and Trademarks*